June 25, 1963 J. W. RYAN 3,095,201

MULTIPLE SPEECH PHONOGRAPH WITH IMPROVED TONE ARM MOUNTING

Filed Feb. 2, 1962

JOHN W. RYAN
INVENTOR.

BY Albert McGinty

ATTORNEY 3,095,201

MULTIPLE SPEECH PHONOGRAPH WITH IMPROVED TONE ARM MOUNTING

John W. Ryan, Bel Aire, Calif., assignor to Mattel, Inc., Hawthorne, Calif.

Filed Feb. 2, 1962, Ser. No. 170,643
8 Claims. (Cl. 274—26)

This invention relates to improvements in a phonograph or phonograph device, by way of example, in the form of a toy which is operative in response to a simple manipulation to speak or pronounce any one of a number of different sentences. Such a device is disclosed in prior application Serial No. 11,203, filed February 25, 1960 and now Patent No. 3,017,187.

An illustrative example of the adaptation or utilization of the said phonograph is that it may be embodied in a doll, and then a child, by a simple manipulation such as, for example, the pulling of a drawstring may cause the doll to speak or pronounce a number of different sentences. A feature of the device is that the record used has a plurality of spaced spiral grooves which are separate in a sense, that each reproduces a separate and distinct sentence or other distinctive sound. Means are provided whereby in response to a simple manipulation such as, for example, the pulling of a drawstring, the needle of the tone or reproducing arm is lifted from the record and moved to the periphery, that is, to the starting point of one or another of the spiral grooves. The tone arm moves relatively to the reproducing cone or disc, and improved constructional features are embodied in this part of the device. The tone arm has sliding relationship with the reproducing cone mounting. The improvements herein reside in an improved mounting of the reproducing cone to protect it from damage and enhance the operation, particularly as respects pressure exerted by the needle. The tone arm has sliding relationship with respect to a mounting member and the reproducing cone has a frictional, sliding mounting relationship with respect to the said mounting member. This relationship has certain objectives. First, the reproducing cone ordinarily may be made of a material that may take a set in storage. This could result in a different needle pressure being exerted on the needle which would, or might interfere with proper operation of the mechanism. The structure just described has the object of overcoming this deficiency.

Ordinarily, also, the material of the cone is relatively fragile and the aforesaid mounting protects it from damage occasioned by sound vibrations of sufficient magnitude to otherwise cause damage. The said sliding mounting dampens out vibrations of such magnitude, and vibrations of smaller magnitude are allowed to be communicated without damage.

A further object is to provide improved means for controlling and regulating the needle pressure by way of an additional spring, preferably a coil spring mounted adjacent one end of the spring mounting member relative to which the tone arm moves. This additional spring exerts a predetermined force on the mounting member or spring which remains substantially the same throughout the movements of the tone arm, and remains substantially the same throughout the life of the device. It allows some deflection of the mounting member, but controls the needle pressure. The accomplishment of this result and the means for so doing constitute additional objects of the invention.

Further objects and numerous additional advantages of the invention will become apparent from the following detailed description and annexed drawings, wherein.

Figure 1:
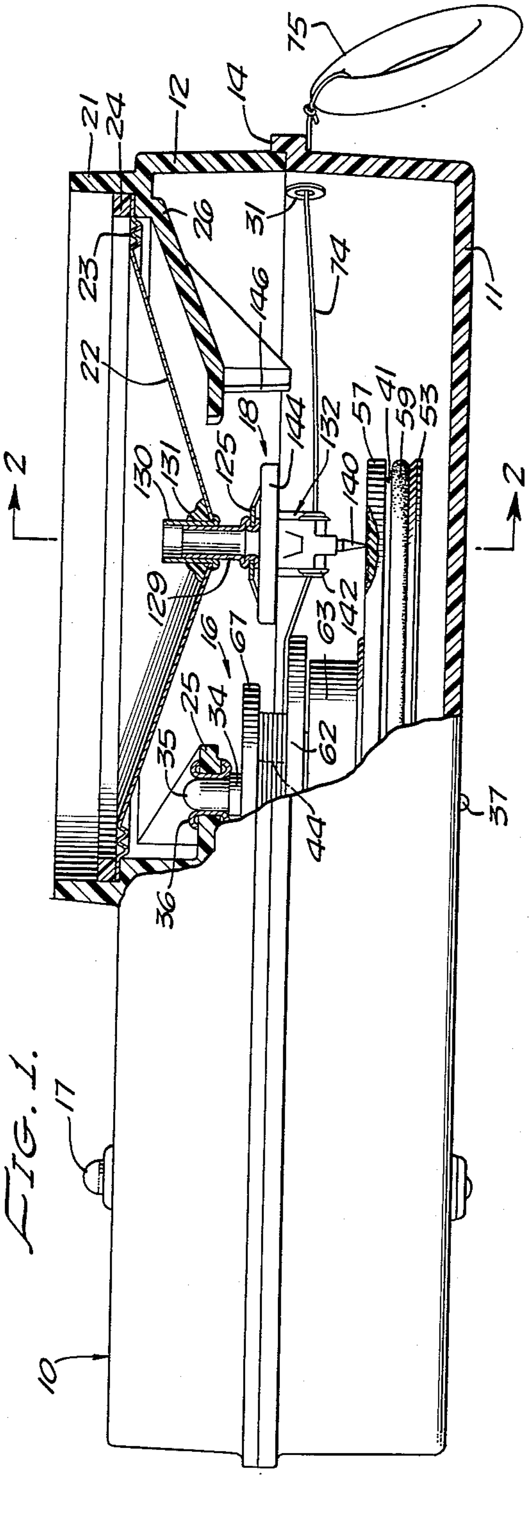
FIGURE 1 is a side view partly in section of the invention.
Figure 2:
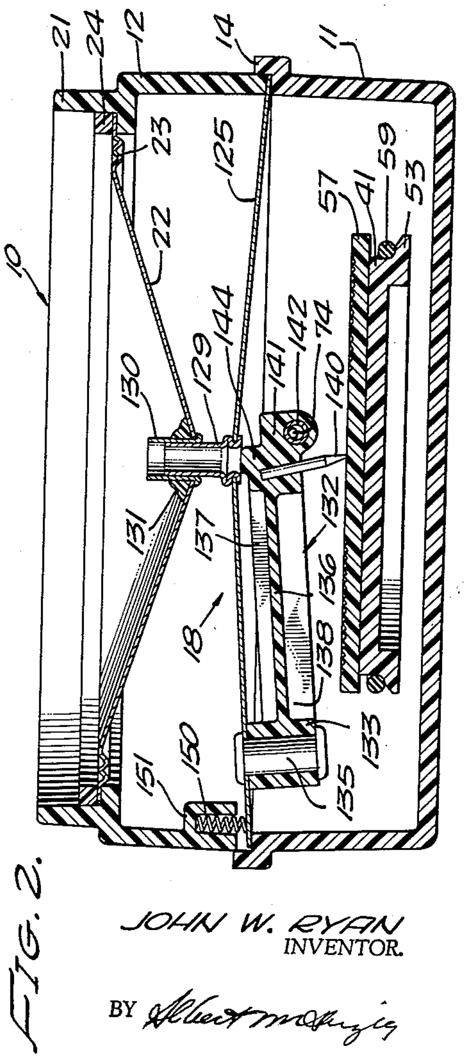
FIGURE 2 is a sectional view taken along the line 2—2 of FIGURE 1.

Referring now more in detail to the drawings and more particularly FIGURES 1 and 2, the invention is shown by way of example as embodied in a plastic housing or casing 10 having a lower portion or half 11 and a cap or cover 12 as seen in FIGURE 2. The housing may have the shape as shown, but of course may have other shapes and configurations. Preferably, the bottom part 11 has a continuous peripheral shoulder 14 which fits against the edge of the cap or cover 12 when it is in position and the two parts may be additionally secured together by tongue and groove securements.

The device may be said to comprise the assemblies including the record drive assembly designated generally at 16, a governor assembly having an extending spindle 17 and the tone arm and reproducing assembly designated generally at 18. The housing 10 is configurated to accommodate these various assemblies. Those parts in which the invention resides are shown in detail.

The upper part of the housing 12 has an upwardly extending circular rim or flange 21 within which is positioned the reproducing cone 22 as will be explained presently. That is, the edges of the cone 22 are adjacent the bottom of the rim 21 and the circular opening within it. Cone 22 has peripheral crimps or grooves 23 and is held by plastic ring 24. The case may be made of plastic also.

Numeral 25 designates an inwardly extending bracket on the inside of the top or cap 12 which forms a support bearing or journal for the record spindle as will be described. Numeral 26 designates an integral bracket extending downwardly and inwardly from the inside of the top of the casing 12 which may be utilized for the purpose of mounting different types of attachments or controls for the mechanism.

Numeral 31 designates an eye or eyelet in a side of the casing part 11 to accommodate a drawstring as will be described for operating the record playing or phonograph mechanism.

The record or rotor spindle is designated at 34. The upper end 35 of the spindle is journalled in a bushing 36 in the bracket 25. The lower end 37 of the spindle is journalled in a bushing mounted in the case 11.

The record spindle 34 has a circular portion 41 forming a turntable for record 57. At the periphery of the turntable 41 it has a continuous flange or shoulder as shown at 53. The record itself may be attached to the disc 41 by being glued or cemented thereto. The rim or flange 53 on the disc 41 has substantially the same diameter as the record 57 so that a belt groove is formed between the record 57 and the rim or flange 53. This groove receives a driving belt 59 which, by way of example, is a means for driving the governor, which may be conventional.

The record 57 in itself is unique in that it has a plurality of individual interleaving spiral grooves, each of which is a separate sound track on which is recorded a distinctive sound, for example a distinctive complete sentence.

The device possesses the quality of randomness of operation in that upon each operation the needle may engage any one of the various grooves randomly so that the sound that is reproduced cannot be anticipated, as explained in the prior application.

The spring arbor 44 has an extending circular part 62 spaced from the upper end of the arbor forming a pulley as will be described. The driving spring is a clock spring as designated at 63, the inner end of which is secured to the spring arbor 44. The other end of the spring 63 extends outwardly through an opening in the side of the casing 10 and is secured to hold it.

Attached to the upper end of the arbor 44 is a plate or disc 67. The drawstring 74 which wraps around the pulley, that is, the upper part of arbor 44 between disc 67 and the extending circular part 62. The drawstring extends through the tone arm assembly 18 as will be described presently, through the eyelet 31 to the exterior of the housing and is attached to a ring 75 for convenient grasping and operating by a child, for example.

Pulling on the drawstring rotates the pulley, that is the arbor 44, and winds up the clock spring 63 and the spring is then able to drive the record disc. A one-way clutch or drive is provided between the record spindle 34 and the spring arbor 44, as described in the previous application.

Numeral 125 designates a flat driving spring for the reproducing cone 22. It is mounted in the casing or housing 10 in a position below the reproducing cone 22. At its ends it engages on the ledge adjacent shoulder 14 of casing 11.

At the center of the spring 125, it has an opening and at this point is secured to the lower end of a small tubular member 129, the securement preferably being by way of the flanges as shown adjacent the opening in the spring as may be seen in FIGURE 2. The tubular member 129 extends through an opening in and mounts the reproducing cone 22 by way of sliding tube 130 which may be secured to cone 22 by glue or wax 131. Means such as silicone grease 134 is used between parts 129 and 130 to dampen the sliding action. The purposes of this arrangement will be described presently.

The tone arm mounting is shown more in detail in FIGURE 2. At its left end it has an integrally formed bushing 133 having a bore journalled on a pin or eyelet 135 having flanged ends which is mounted from the spring 125 as shown. The arm 132 has a central web 136 adjacent which are longitudinally extending grooves 137 and 138 so that the tone arm is very light. It may be fabricated from plastic for example. The needle 140 is mounted slightly angularly as shown at the end of the tone arm and beyond the needle the tone arm has a portion 141 in which is positioned transversely an eyelet 142 having flanged ends as shown and through which passes the drawstring 74. Near the end of the tone arm at its upper part is a transversely extending rib 144 which slidably engages the flange or rim at the lower end of the tubular member 129 which, as described, is attached to the driving spring 125 for the reproducing cone. The tone arm is movable about its pivotal mountings so that the needle 140 can be swung from an intermediate point on the record, that is, from the end of the playing surface to the periphery. When the tone arm so moves, the rib 144 slides frictionally relative to the lower end of the tubular member 129. That is, the reproducing cone 22 does not move with the tone arm itself; these parts move relatively.

As may be seen in FIGURE 1, the eyelet 142 in the end of the tone arm is slightly below the circular part 62 of the pulley around which the drawstring 74 is wrapped. Normally, in operation when the needle has moved to the interior of the playing surface of the record 57, the drawstring 74 is then manipulated, that is, it is pulled or tensioned by the drawstring by grasping and pulling the ring 75. The tension in the string or cord 74 is sufficient to lift the tone arm 132 from the surface of the record. As the cord or string 74 is pulled, the friction between it and the interior of the eyelet 142 is sufficient to move the tone arm to the exterior or periphery of the record 57. At this point, its movement is terminated or stopped by a stop member 146 extending from the bracket 26.

The tone arm has now been properly positioned for another operation and the needle 140 may now engage in any one of the spiral grooves of the record as previously described. That is, there may result from each manual operation that the device speaks or pronounces a different sentence or other distinctive sound.

Continuing the description of the operation, the engagement of the tone arm with the stop 146 does not restrain continued movement of the drawstring or cord 74. Pulling on the drawstring of course winds the spring 63, as previously described, by rotating its pulley and this operation as stated is not terminated or prevented by reason of the tone arm having been returned to its starting position. The spring 63 may be completely wound by one extended pull on the drawstring. However, less extended or shorter pulls may be exerted on the drawstring simply for the purpose of resetting the tone arm to the initial position to reproduce the different sentences or distinctive sounds from the record 57. Each of such shorter pulls partially winds the spring 63, the winding being accomplished through the one-way clutch or drive as previously described.

Numeral 150 designates a coil spring, one end of which fits into a socket or depression in a boss 151 formed on the inside of the cover 12. The other end of spring 150 bears against an end part of the mounting spring 125 adjacent its edge part which rests on the ledge adjacent shoulder 14. The purpose of spring 150 is to control and maintain the needle pressure. It is important to maintain the needle pressure since the device is mounted within a doll which is held in many different positions. Also, the tone arm is subjected to many manipulations by the drawstring 74 and ring 75 moving the needle out of and into engagement with the record. The spring 150 exerts a predetermined force at the time of installation and this spring may be half compressed, for example. The force it exerts varies only slightly during manipulations of the tone arm, there being slight deflections of the spring 125. It serves to maintain the desired needle pressure. As explained previously, the cone 22 may be made of a material which may take a set in storage and this may be a relatively fragile material. In the construction shown, it has peripheral edge grooves or crimps, as shown at 23, and the edge is held by the ring 24. Material which may take a set in storage would result in a different needle pressure being exerted on the tone arm which could or might result in impairment of the operation of the device. This is overcome by the sliding mounting or connection between the tube 129 and the reproducer cone, as shown in detail in FIGURE 3. The silicone grease 134 provides the proper amount of friction so that the proper needle pressure is not interfered with. The sliding mounting also prevents sound vibrations of relatively large magnitude from damaging the relatively fragile speaker cone, the sliding mounting dampening these vibrations out and allowing them to pass through without damage. Vibrations of smaller magnitude on the other hand, are transmitted in the ordinary manner without damage to the cone. Spring 150 assists in maintaining proper needle pressure during relative movement between parts 129 and 130.

From the foregoing it will be observed by those skilled in the art that the invention as described herein achieves all of the objects as stated in the foregoing and all of the advantages, as well as many additional advantages. The needle pressure is maintained in a portable device and the detailed deficiencies of the prior art are otherwise overcome, as explained.

The invention provides a construction which is simple and effective but yet very rugged and durable and capable of withstanding rather rough treatment.

Figure 3:
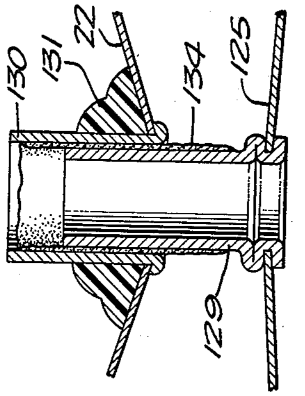
FIGURE 3 is an enlarged, detail view of a portion of the structure shown in FIGURES 1 and 2.

As will be obvious from the foregoing disclosure, release of the ring 75 after tensioning the driving spring, will result in rotation of the record 57 until ring 75 is again drawn against the side of casing 11 at which point it will be stopped. However, tension in the driving spring will hold cord or drawstring 74 sufficiently taut to hold the tone arm upwardly out of contact with the record and this condition is maintained while the device is inactive and/or in storage. The provision of the slidable connection between the support means and the speaker cone 22, as shown in FIG. 3, provides for relative movement so that the spring 125 and tube 134 can assume a position corresponding to that of the raised tone arm without holding the speaker cone 22 permanently stressed during that time. The speaker cone is thus free to assume a natural unstressed condition and thus will not take a permanent set during periods of storage.

As previously stated, the material between the movable tubes shown in FIG. 3 is preferably a silicone grease. A well-known characteristic of the silicone materials is that they respond very much like a solid when forces are suddenly applied but continued and prolonged application of such results in flow of liquid characteristics. Thus, the grease is capable of transmitting audio frequency variations from the tone arm to the speaker cone without appreciable slippage but the holding of the tone arm in raised position for an appreciable length of time results in the described movement which relieves the cone of all stress and prevents it from acquiring a permanent set.

It is to be understood that the invention is not to be limited to the precise forms and embodiments as disclosed herein since they are intended to be illustrative of the principles of the invention. The concept and principles of the invention may be embodied in other devices of larger size and adapted in other forms. The invention is to be accorded the full scope of the claims appended hereto.

What is claimed is:

1. In a phonograph device having a record, a reproducing element and a tone arm carrying a needle, means providing a connection between the tone arm and the reproducing element, said tone arm being mounted for movement toward and from said record, said connection including relatively movable members whereby to allow movement of the tone arm relative to the record without movement of the reproducing element, and means disposed between said members having the characteristic of being capable of transmitting vibrations of sonic frequency from said tone arm to said reproducing element.

2. The structure as in claim 1 wherein said means disposed between said members comprises a grease-like material.

3. The structure as in claim 2 wherein said grease-like material is a silicone grease.

4. A device as in claim 1 including a support means having one of said relatively movable members mounted thereon and said tone arm being mounted to move relatively to said support means.

5. A device as in claim 4 wherein said tone arm is pivotally mounted on said support means.

6. In a phonograph device having a record, a reproducing element and a tone arm including a needle, means providing a connection between the needle and the reproducing element, said needle being mounted for movement toward and from said record, said connection including relatively movable members whereby to allow movement of the needle relative to the record without movement of the reproducing element, and non-solid restraining means disposed between said members and having the characteristic of being capable of transmitting vibrations of sonic frequencies from said tone arm to said reproducing element, said restraining means being such as to allow said members to have freedom of relative movement therebetween subject only to the restraint provided by the physical characteristics of said non-solid restraining means.

7. The structure as in claim 6 wherein said members comprise relatively movable telescoping elements having the said restraining means between them.

8. The structure as in claim 7, wherein said restraining means comprises a grease-like material between said elements.

References Cited in the file of this patent

UNITED STATES PATENTS

| | | |
|---|---|---|
| 639,452 | Smallwood | Dec. 19, 1899 |
| 2,942,888 | Duncan | June 28, 1960 |